July 12, 1966  D. W. MILLER  3,260,351

TRAVELING TRAY CONVEYOR STABILIZING MEANS

Filed July 9, 1964  3 Sheets-Sheet 1

INVENTOR.
BY DANIEL W. MILLER
Otto Moeller
Attorney

July 12, 1966  D. W. MILLER  3,260,351
TRAVELING TRAY CONVEYOR STABILIZING MEANS
Filed July 9, 1964  3 Sheets-Sheet 2
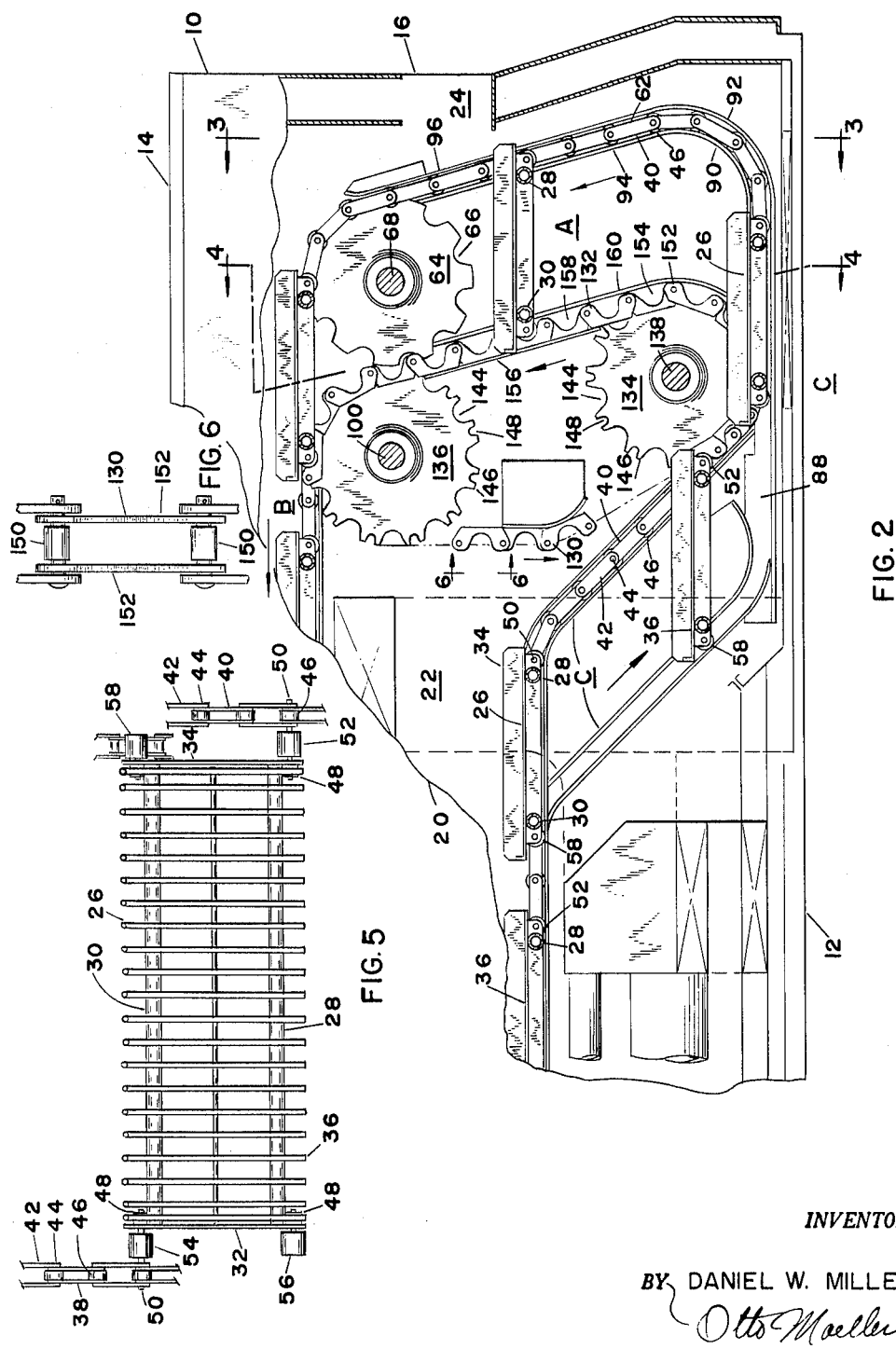
INVENTOR.
BY DANIEL W. MILLER
Otto Moeller
Attorney July 12, 1966   D. W. MILLER   3,260,351
TRAVELING TRAY CONVEYOR STABILIZING MEANS
Filed July 9, 1964   3 Sheets-Sheet 3

INVENTOR.
BY DANIEL W. MILLER
Otto Moeller
Attorney

United States Patent Office 3,260,351
Patented July 12, 1966

3,260,351
TRAVELING TRAY CONVEYOR
STABILIZING MEANS
Daniel W. Miller, Spring Grove, Pa., assignor to Read Corporation, York, Pa., a corporation of Delaware
Filed July 9, 1964, Ser. No. 381,433
3 Claims. (Cl. 198—138)

This invention relates to an endless traveling tray type conveyor for commercial baking ovens and more particularly to a conveyor system for the pan supporting trays including improved stabilizing means for maintaining the trays in a horizontal position as they follow a circuitous path from a lower horizontal run to and along an upright run adjacent the loading and unloading end of the oven, and from the upright run to and along an upper horizontal run.

An important object of this invention is to provide effective and simplified means that maintains the pan supporting trays in horizontal position and stabilized against tilting as they follow the said circuitous path, even though the trays may happen to be unevenly loaded with pans of dough.

In accordance with the present invention, one diagonally opposite pair of corners of the trays are pivotally attached to a pair of laterally spaced endless trays conveyor chains disposed at opposite sides of the oven. The tray conveyor chains are each trained over vertically spaced upper and lower sprockets at the loading and unloading end of the oven, with the sprockets for the chain at one side of the oven being spaced rearwardly of the sprockets of the chain at the opposite side of the oven a longitudinal distance equal to the longitudinal distance between the pivotal connections of the trays with the chains. An important feature of the invention is the provision of a novel and improved auxiliary stabilizing chain and sprockets therefor to maintain the trays in horizontal stabilized condition as the trays, through their pivotal connections with the tray conveyor chains, follow the path of said chains at the loading and unloading end of the oven. More particularly, the links of the stabilizing chain are so formed as to provide in themselves means for picking up an outboard tray roller at the unattached rear corner of a tray for stabilizing the tray, and the sprockets for the stabilizing chain are formed to accommodate the pins of the stabilizing chain as well as the tray rollers.

Other objects and advantages of the invention will be hereinafter pointed out or will become apparent from the following description taken in conjunction with the accompanying drawings, in which:

FIGURE 2 is a longitudinal vertical sectional view through the forward end portion of the oven showing that part of the novel tray conveying means disposed in the right side of the oven, parts again being shown in elevation;

FIGURE 5 is a plan view of one of the tray conveyors showing the connections thereof with the tray conveying chains; and FIGURE 6 is an enlarged fragmentary view of the stabilizing chain taken on line 6—6 of FIGURE 2.

Figure 1:
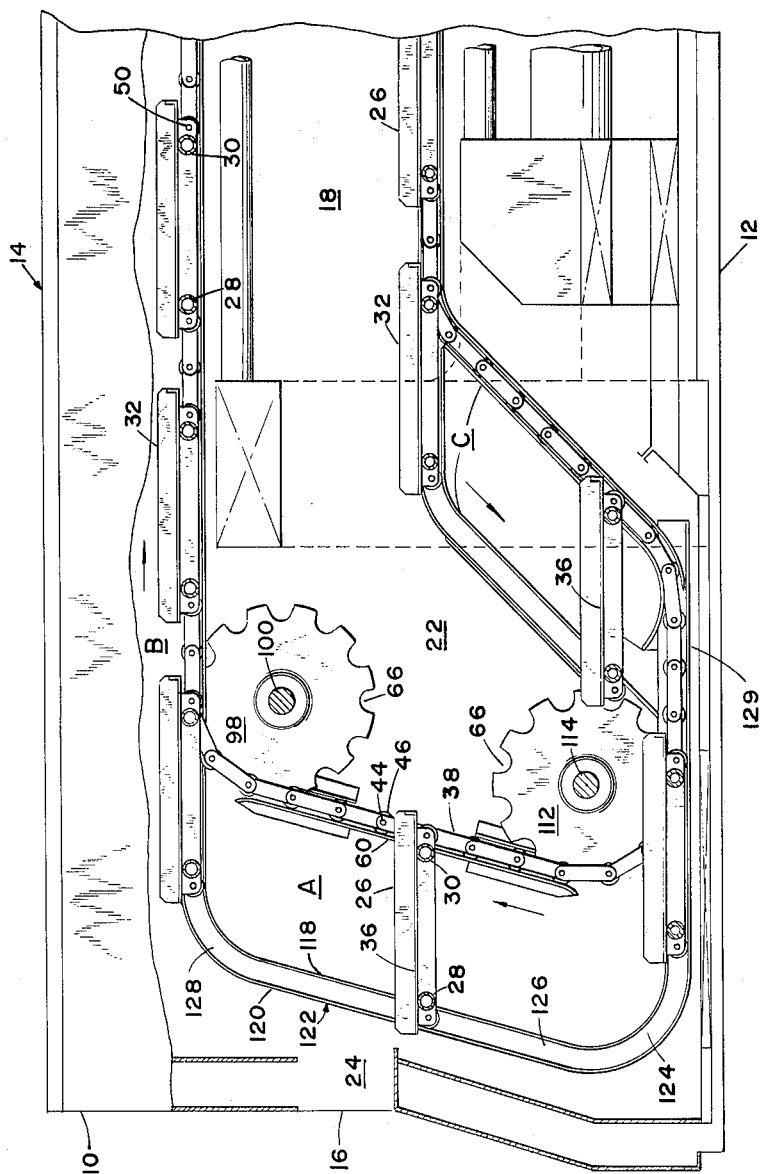
FIGURE 1 is a longitudinal vertical sectional view through the forward end portion of the oven showing that part of the novel tray conveying means disposed in the left side of the oven, when viewed from the front thereof, with parts shown in elevation.

Referring to the drawings, the numeral 10 designates a commercial type oven of generally longitudinally elongated rectangular configuration, only so much thereof being shown as is necessary to a complete understanding of the invention. The oven 10 includes a base or floor 12, a top wall 14, a front wall 16, side walls 18 and 20, and a rear wall (not shown) enclosing a baking chamber 22. For convenience in locating the various elements of the invention, in the following description the side wall 18 will be referred to as the left side wall with that side of the oven adjacent thereto being referred to as the left side of the oven, and the side wall 20 will be referred to as the right side wall with that side of the oven adjacent thereto being referred to as the right side of the oven. In conventional manner, the walls of the oven are formed by inner and outer spaced sheets between which suitable insulating material is interposed, and between which drive elements and other appurtenances may also be accommodated.

The front wall 16 is provided with a loading and unloading opening 24 through which successive rows of pans of dough products to be baked are delivered onto, and successive rows of pans of baked dough products are removed from, successive trays 26 that are arranged to be transported in a closed loop through the baking chamber 22 by conveying means hereinafter described in detail.

The trays 26 may be of any suitable type well known in the art, and preferably, as illustrated, are of generally rectangular shape, comprising a pair of transversely extending, longitudinally spaced tubular frame members 28 and 30, a pair of longitudinally extending side frame members 32 and 34 secured in suitable manner to and connecting the ends of the tubular members 28 and 30, and a grid type pan supporting shelf made up of a plurality of longitudinally extending laterally spaced rods 36 secured in suitable manner to the tubular frame members 28 and 30.

Each of the trays 26 is pivotally supported at two diagonally opposite corners by the endless chains 38 and 40, arranged to convey the trays 26 in an endless path through the oven baking chamber 22. The chains 38 and 40 may be of any suitable construction and, as illustrated, comprise a plurality of links 42 inter-connected by pins 44 carrying rollers 46. Referring particularly to FIGURE 5, the rear left corner of each tray 26 is pivotally connected to the endless chain 38 and the front right corner of each tray 26 is pivotally connected to the endless chain 40. The means for pivotally connecting the right front corner of a tray 26 to the chain 40 includes a hub-like member 48 rigidly secured to the tray side frame member 34 adjacent the forward end thereof, and a pin 50 rigidly secured in the hub-like member 48 and extending laterally outward therefrom. The outer end of the pin 50 extends through a roller 46 of the chain 40, the pin 50 replacing the usual chain pin 44. An outboard roller 52 is carried by the pin 50 between the chain 40 and the hub-like member 48, which roller 52 is adapted to engage certain guide and supporting elements, as hereinafter described. The left rear corner of each tray 26 is supported in similar manner by the chain 38, and is provided with a similar tray roller 54. By the above described means, the trays 26 are connected with the conveyor chains 38 and 40 for movement thereby, and also for relative pivotal movement with respect thereto about the axes of the pins 50, so that the trays may be maintained in a horizontal position, by means hereinafter described, as the conveyor chains 38 and 40 follow their circuitous path through the oven baking chamber 22.

The diagonally opposite left front and right rear corners of the trays 26 are not connected with the conveyor chains 38 and 40, but carry outboard rollers 56 and 58. As best shown in FIGURE 5, tray conveyor roller 56 is longitudinally alined with tray conveyor roller 54 and transversely alined with tray conveyor roller 52, and tray conveyor roller 58 is longitudinally alined with tray conveyor roller 52 and transversely alined with tray conveyor roller 54.

The trays 26 are arranged to be moved by the conveyor chains 38 and 40 in the direction of the arrows in FIGURES 1 and 2, along an upright tray conveyor run A adjacent the oven front wall 16 past the loading and unloading opening 24, then along a horizontal upper tray conveyor run B to the rear of the oven, and then along a lower tray conveyor return run C. The upright tray conveyor run A is preferably arranged to slope slightly rearward from its lower to its upper end.

As previously set forth, the right front corners of the trays 26 are pivotally attached to the conveyor chain 40 and the left rear corners of the trays 26 are pivotally attached to the conveyor chain 38, therefore, to maintain the trays 26 in transverse parallelism with the oven front wall 16 and also to maintain them in a horizontal plane as they travel along upright run A, the upright reach 60 of conveyor chain 38 is offset rearwardly with respect to the upright reach 62 of the conveyor chain 40 a distance equal to the longitudinal distance between the diagonally opposite tray pins 50 of the attached corners of the trays 26.

At the junction of the upright tray conveyor run A and the horizontal upper tray conveyor run B, the chain 40 (to which the right front corners of the trays 26 are pivotally attached) is trained around a sprocket 64. The sprocket 64 is provided on its periphery with a plurality of equidistantly spaced arcuate depressions 66 spaced a chain pitch apart so that each of the chain rollers 46 of the chain 40 will be successively engaged in one of the depressions 66 to guide and drive the chain 40. The sprocket 64 is fixed on the inner end of a stub shaft 68 that projects through the inner sheet of the oven side wall 20. The stub shaft 68 is rotatably mounted in a bearing 70 disposed and suitably supported adjacent the inner sheet of oven side wall 20 in the space between the inner and outer sheets of oven side wall 20. Fixed on the shaft 68 outwardly of the bearing 70 between the inner and outer sheets of oven side wall 20 is a drive chain sprocket 72. The sprocket 72 is connected by a chain 74 with a chain sprocket 76 fixed on one end of a transversely extending main drive shaft 78 disposed in the upper forward end portion of the oven. The drive shaft 78 is rotatably mounted in bearings 80 and 82 disposed and suitably supported adjacent the inner sheets of respective oven side walls 20 and 18 in the space between the inner and outer sheets of the said oven side walls. The main drive shaft 78 is driven by a drive chain sprocket 84 fixed on shaft 78 between the bearing 80 and chain sprocket 76, the drive chain sprocket 84 being connected by sprocket chain 86 to a driving motor (not shown).

Along the return run C of the tray conveyor adjacent the vertical run A, the rollers 46 of conveyor chain 40 and the outboard tray rollers 52 and 58 on the right side of the trays 26 engage and are supported on a track section 88 which is suitably secured to the inside of the inner sheet of oven side wall 20. At the junction of return conveyor run C and upright conveyor run A, the conveyor chain 40 follows an arcuate path, it being constrained in its path by inner and outer concentric arcuate track sections 90 and 92, suitably secured to the inside of the inner sheet of oven side wall 20. The arcuate track sections 90 and 92 are arranged to receive between them, the rollers 46 of conveyor chain 40 and the outboard roller 52 at the front right corner of the trays 26. In similar manner, the rollers 46 of conveyor chain 40 and the outboard tray roller 52 is arranged to be received between inner and outer upright track sections 94 and 96 disposed along the upright reach 62 of conveyor chain 40. If desired, a sprocket similar to sprocket 64 may replace the arcuate track sections 90, 92 for guiding the tray conveyor chain 40.

Figure 4:
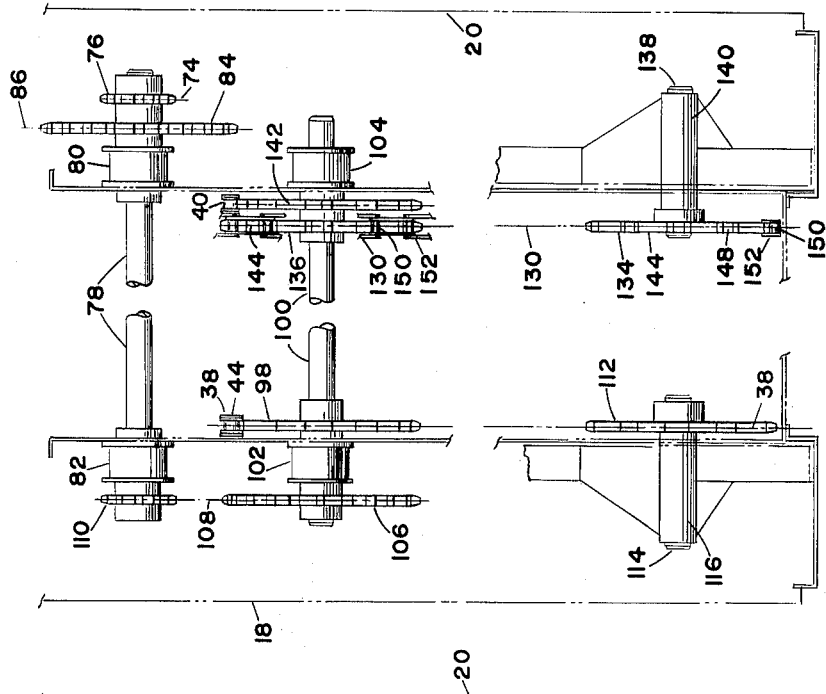
FIGURE 4 is a sectional view taken on line 4—4 of FIGURE 2 with parts of the oven being shown in conventional lines.
Figure 3:
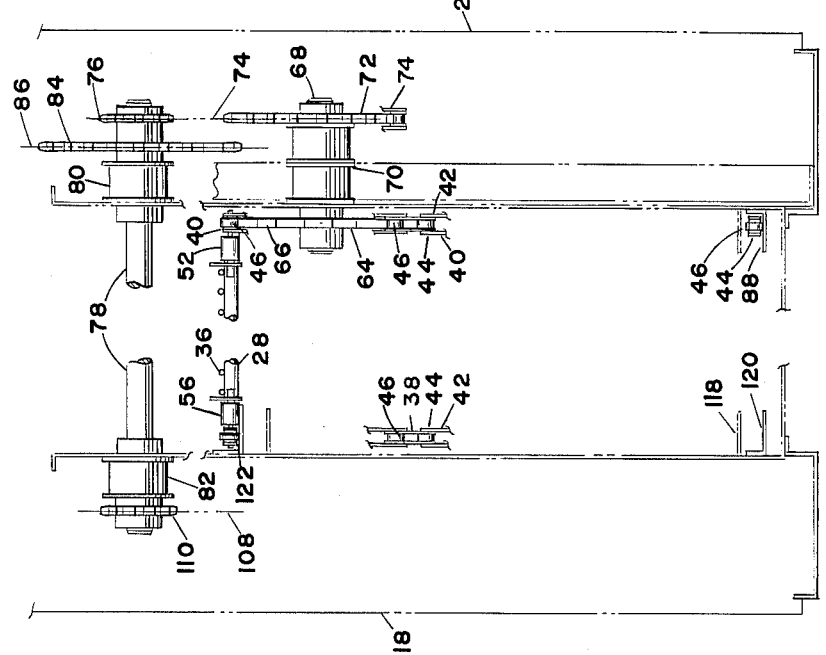
FIGURE 3 is a sectional view taken on line 3—3 of FIGURE 2 with parts of the oven being shown in conventional lines.

As previously described, the upright reach 60 of conveyor chain 38 is offset rearwardly with respect to the upright reach 62 of conveyor chain 40. At the upper end of the vertical upright reach 60 the chain 38 is trained around a sprocket 98 fixed on a transversely extending jack shaft 100 that extends between and projects beyond the inner sheets of oven side walls 18 and 20, as best shown in FIGURE 4. The sprocket 98 is in all essential respects the same as previously described sprocket 64 so that each of the rollers 46 of the chain conveyor 38 will be successively engaged in one of the depressions of the sprocket 98. The jack shaft 100 is rotatably mounted in bearings 102 and 104 respectively secured to the inner sheets of the oven side walls 18 and 20, in the space between the inner and outer sheets of the said oven side walls. Fixed on the shaft 100 outwardly of the bearing 102 between the inner and outer sheets of oven side wall 18 is a drive chain sprocket 106. The sprocket 106 is connected by a chain 108 and a chain sprocket 110 fixed on the end of the main drive shaft 78 outwardly of the bearing 82. The sprockets 106 and 110 are in all essential respects the same as respective sprockets 72 and 76, and since as previously stated, conveyor chain sprockets 64 and 98 are in all essential respects the same, it is evident that conveyor chains 38 and 40 are synchronously operated so that the opposite ends of the trays 26 are uniformly advanced.

At the lower end of the upright reach 60 of the conveyor chain 38, as best shown in FIGURES 1 and 4, the chain 38 is trained around a sprocket 112 fixed on the inner end of a stub shaft 114 that projects through the inner sheet of the oven side wall 18. The sprocket 112 is in all essential respects the same as previously described sprocket 64 so that each of the rollers 46 of the chain conveyor 38 will be successively engaged in one of the depressions of the sprocket 112. The stub shaft 114 is rotatably mounted in a bearing 116 disposed and suitably supported adjacent the inner sheet of oven side wall 18 in the space between the inner and outer sheets of oven side wall 18.

As the conveyor chain 38, to which the left rear corners of the trays 26 are connected, travel around lower sprocket 112, along upright reach 60 and around upper sprocket 98; the tray conveyor rollers 56 of the unattached left front corners of the trays 26 engage between inner and outer tracks 118 and 120 of a tray roller guide 122 including a lower arcuate section 124, an upright section 126 and an upper arcuate section 128. The tray roller guide 122 is suitably attached to the inside of the inner sheet of oven side wall 18. Along the return run C of the tray conveyor adjacent the vertical run A, the rollers 46 of conveyor chain 38 and the outboard tray conveyor rollers 54 and 56 on the left side of the trays 26 engage and are supported on a track section 130 forming a horizontal rearward extension of the outer track of lower arcuate track section 124.

The trays 26, as they move along the lower run C adjacent the upright run A, are maintained in horizontal position since at their front and left rear corners they are pivotally attached to the conveyor chains 40 and 38, respectively, the rollers 46 of which engage and are supported by the track sections 88 and 129, and additionally the outboard tray rollers 52 and 54 at these corners likewise engage and are supported by track sections 88 and 129; and since at their right rear and left front corners the tray rollers 58 and 56 engage and are supported by the track sections 88 and 129. Thus all four corners of the trays are positively supported.

As a tray 26 moves from the horizontal lower run C to and along the upright run A, its rearward end follows the rearwardly offset upright reach 60 of conveyor chain 38 since, as previously described, the left rear corner of the tray 26 is pivotally attached to the chain 38. At the same time, the forward end of the tray 26 follows the upright reach 62 of the conveyor chain 40 since, as also previously described, the right front corner of the tray 26 is pivotally attached to the chain 40. In order to prevent downward or upward tilting of the trays about their diagonally opposite pivotally attached ends as the trays are elevated along upright run A, auxiliary means is employed for maintaining the trays in stabilized and horizontal position, and for providing positive lifting of the trays at an additional corner thereof.

The auxiliary stabilizing means includes an upright endless chain 130 disposed in a longitudinally extending vertical plane at the right side of the oven baking chamber 22 adjacent and laterally inwardly offset with respect to the plane of the tray conveyor chain 40. The ascending forward run 132 of the stabilizing chain 130 is disposed in a common transverse plane with the ascending upright run 60 of the tray conveyor chain 38. The lower end of the chain 130 is trained around a sprocket 134 while the upper end thereof is trained around a sprocket 136. Sprocket 134 is fixed on the inner end of a stub shaft 138 that projects through the inner sheet of oven side wall 20 and is in axial alinement with stub shaft 114. The stub shaft 138 is rotatably mounted in a bearing 140 disposed and suitably supported adjacent the inner sheet of oven side wall 20 in the space between the inner and outer sheets of oven side wall 20. Sprocket 136 is freely mounted on jack shaft 100 for rotation with respect thereto.

The means for driving the stabilizing chain 130 includes a sprocket 142 freely mounted on the jack shaft 100 between the sprocket 136 and the inner sheet of oven side wall 20. The sprocket 142 is rigidly secured to the sprocket 136 for driving the latter and is disposed in a common longitudinal vertical plane with the tray conveyor chain 40. Sprocket 142 is in all essential respects the same as previously described sprocket 64 so that each of the rollers 46 of the tray conveyor chain 40 will successively engage in one of the depressions of the sprocket 142 for rotating the latter.

The sprockets 134 and 136 over which the stabilizing chain 130 is trained, are in all essential respects the same as previously described sprocket 64, except as herein otherwise noted, the depressions 144 in the periphery thereof being adapted to accommodate the outboard tray rollers 52 and 58. Each of the teeth 146 of the sprockets 134 and 136 is provided in its peripheral surface with a centrally disposed arcuate depression 148 so that each of the chain rollers 150 of the stabilizing chain 130 will be successively engaged in one of the depressions 148 of the sprockets 134 and 136. In view of the limited chordal thickness of the teeth 146 of sprockets 134 and 136, the depressions 148 are made considerably smaller than the tray roller receiving depressions 144, and the chain rollers 150 are accordingly of considerably smaller diameter than the tray rollers 52 and 58.

Each of the links 152 of the stabilizing chain 130 is of generally U-shape providing an outwardly opening pocket 154, which is arranged to substantially coincide with the depressions 144 of the sprockets 134 and 136 so as to permit entry therein of the tray rollers 52 and 58, and on the ascending run of the trays, to form a stabilizing support for the right rear corner of the tray by engagement with the tray roller 58. A back-up track 156, suitably secured to the inner sheet of oven side wall 20, is disposed along the rearward side of the ascending run 158 of the stabilizing chain 130. A track 160 disposed along the forward side of the ascending run of stabilizing chain 130 retains the tray rollers 58 in the pockets 154 of the stabilizing chain, and cooperates with the back-up track 156 to stabilize the trays 26.

With each link of stabilizing chain 130 being formed with a tray roller receiving pocket 154, it will be seen that the tray pitch (the distance between corresponding rollers of successive trays, e.g., tray rollers 58) can be varied by any desired whole number of chain pitches to thereby accommodate trays of different lengths or tray spacing, while retaining the same size sprockets, since there will always be a tray roller receiving pocket in position to engage a tray roller. It is therefore possible to maintain a uniform height for ovens having different tray pitches, it being understood, of course, that the horizontal distance between the upright tracks and chains associated with the forward and rearward tray rollers is increased or decreased to conform with such different tray sizes.

As a tray ascends vertical tray conveyor run A, the right front and left rear corners are held against upward or downward displacement relative to the chains 40 and 38 since, as previously described, the right front and left rear corners of the tray are pivotally attached to the chains 40 and 38, respectively. The left front corner of the tray is unattached and were the right rear corner free, it is apparent that the tray could tilt about its diagonally pivoted corners. The previously stated preferred use of the tray roller guide 122 in which the tray roller 56 is arranged to be received would obviously limit such pivotal movement. However, necessary clearances to compensate for manufacturing tolerances of parts, uneven construction and expansion of parts, and uneven loading of the trays permit of an undesirable degree of tilting. Additionally, the tilting of the tray effects a binding or dragging action of the roller aaginst the tray roller guide as the tray is elevated, resulting in jamming of the tray by reason of eventual bending or breaking of the tray pin and also substantially increasing the power required to elevate the tray.

Such undesirable tilting of the tray is prevented by the stabilizing chain 130. Upon approaching the sprocket 134, the right rear tray roller 58 engages the pocket 154 of a stablizing chain link 152, and is retained therein in the manner previously described to prevent upward or downward displacement of the right rear corner of the tray as the tray stabilizing chain 130 in cooperation with the tray conveyor chains 40 and 38 elevates the tray along the upright tray conveyor run A, to maintain the tray in stabilized and horizontal position.

With the trays stabilized in the manner set forth above, whereby they are maintained in horizontal position as they ascend along the upright tray conveyor run A, it is apparent that they may be loaded manually or by known mechanical means without the necessity of exercising precaution to balance the load on the trays.

I claim:
1. A stabilized tray conveyor for an oven, including
   a first and second endless chain disposed adjacent opposite sides of said oven, each including spaced upper and lower runs and a connecting upright run,
   the upright run of said second endless chain being disposed in parallel rearwardly offset relation with respect to the upright run of said first endless chain,
   a plurality of equidistantly spaced trays each pivotally attached at one front corner portion to said first endless chain and at its diagonally opposite rear corner portion to said second endless chain,
   a series of end to end pivotally connected links forming a third endless chain offset laterally inward of and adjacent said first endless chain and being trained over an upper and a lower sprocket, said sprockets being respectively disposed adjacent the upper and lower runs of said first endless chain in a common longitudinal plane and positioned to dispose the upright forward run of said third endless chain in a common transverse plane with the upright run of said second endless chain,
   means for driving said first, second and third endless chains in the same direction and at the same speed,
   each of the links of said third endless chain being substantially U-shaped between their pivotally connected ends with the open side thereof facing outwardly of said third endless chain,
   an outboard roller carried by the unattached rear cor- ner portion of each tray adapted to be snugly received in a said U-shaped link to cooperate with said pivotal attachments of said trays to said first and second endless chains to secure said trays against tilting as said trays move from said lower run to said upright run, along said upright run and from said upright run to said upper run, and said sprockets having a plurality of equidistantly spaced arcuate circumferential recesses registering with said U-shaped links for transient reception of said outboard rollers in said U-shaped links and said sprocket recesses as said trays move from said lower run to said upright run and from said upright run to said upper run.

2. A stabilized tray conveyor for an oven, including a first and second endless chain disposed adjacent opposite sides of said oven, each including spaced upper and lower runs and a connecting upright run, the upright run of said second endless chain being disposed in parallel rearwardly offset relation with respect to the upright run of said first endless chain, a plurality of equidistantly spaced trays each pivotally supported at one front corner portion by said first endless chain and at its diagonally opposite rear corner portion by said second endless chain, a series of pivotally connected links forming a third endless chain offset laterally inward of and adjacent said first endless chain and being trained over an upper and a lower sprocket to dispose the upright forward run of said third endless chain in transverse parallel alinement with the upright run of said second endless chain, an outboard roller carried by the unattached rear corner portion of each tray disposed in longitudinal alinement with said third endless chain and sprockets, said sprockets having a plurality of equidistantly spaced peripheral indentations adapted for transient engagement by said tray outboard rollers, the lands of said sprockets between said peripheral indentations being each provided with a shallow indentation for reception of the pivotal connections of the links of said third endless chain, the links of said third endless chain being generally U-shaped to substantially coincide with the first named indentations in said sprockets for reception therein of said tray outboard rollers, said tray outboard rollers being retained in said U-shaped links against relative vertical displacement with respect to the forward upright run of said third endless chain and cooperating with the pivotal connections of said trays with said first and second endless chains to maintain said trays in stabilized horizontal position as said trays are moved along the upright forward runs of said chains, and means for driving said first, second and third endless chains in the same direction and at the same speed.

3. A stabilized tray conveyor for an oven, including a first and second endless chain disposed adjacent opposite sides of said oven, each including spaced upper and lower runs and a connecting upright run, the upright run of said second endless chain being disposed in parallel rearwardly offset relation with respect to the upright run of said first endless chain, a plurality of equidistantly spaced trays each pivotally supported at one front corner portion by said first endless chain and at its diagonally opposite rear corner portion by said second endless chain, a series of pivotally connected links forming a third endless chain offset laterally inward of and adjacent said first endless chain and being trained over an upper and a lower sprocket to dispose the upright forward run of said third endless chain in transverse parallel alinement with the upright run of said second endless chain, said first, second and third endless chains having the same pitch, an outboard roller carried by the unattached rear corner portion of each tray disposed in longitudinal alinement with said third endless chain and sprockets, the said outboard rollers of successive trays measured along the length of said chains being spaced any one of a number of whole chain pitches apart, said sprockets having a plurality of peripheral indentations spaced a chain pitch apart adapted for transient engagement by said tray outboard rollers, the lands of said sprockets between said peripheral indentations being each provided with an indentation for reception of the pivotal connections of the links of said third endless chain, the links of said third endless chain each being generally U-shaped to substantially coincide with the first named indentations in said sprockets for reception therein of said tray outboard rollers, said tray outboard rollers being retained in said U-shaped links against relative vertical displacement with respect to the forward upright run of said third endless chain and cooperating with the pivotal connections of said trays with said first and second endless chains to maintain said trays in stabilized horizontal position as said trays are moved along the upright forward runs of said chains, and means for driving said first, second and third endless chains in the same direction and at the same speed.

References Cited by the Examiner

UNITED STATES PATENTS 2,965,049   12/1960   Royer _____ 198—138
3,186,783    6/1965   Graber _____ 312—268

EVON C. BLUNK, *Primary Examiner.*

RICHARD E. AEGERTER, *Examiner.*